April 2, 1935.  L. J. SANDER  1,996,436
COVER FOR PIPE ENDS
Filed April 3, 1931
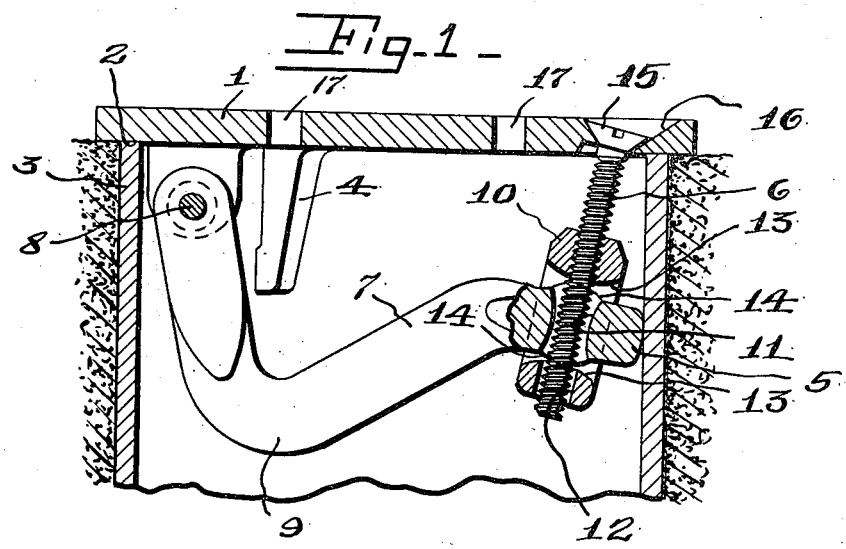
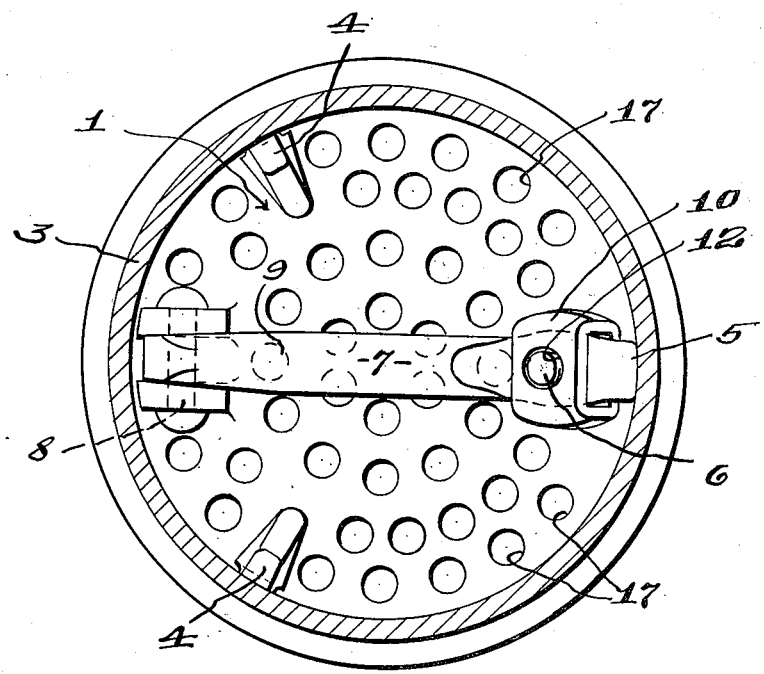
INVENTOR
Louis J. Sander
BY
Bodell & Thompson
ATTORNEYS.

Patented Apr. 2, 1935

1,996,436

UNITED STATES PATENT OFFICE 1,996,436

COVER FOR PIPE ENDS

Louis J. Sander, Buffalo, N. Y.

Application April 3, 1931, Serial No. 527,505

4 Claims. (Cl. 137—13)

This invention relates to covers for vent pipes, manholes and other forms of pipe or conduit ends, and has for its object a particularly simple and efficient means for securing the cover to the pipe end, which means compensates for variations in the pipe ends of a given size and also compensates for expansion and contraction and hence holds the cover tight under all conditions.

The invention consists in the novel features and combinations and constructions hereinafter set forth and claimed.

In describing this invention, reference is had to the accompanying drawing in which like characters designate corresponding parts in all the views.

Figure 1 is a transverse sectional view of a cover embodying this invention, the same being shown as applied to a pipe end.

Figure 2 is an inverted plan view, the pipe end being shown in section.

This invention comprises generally a cover having a shoulder for thrusting against the inner surface of the pipe end, wedging means for thrusting against the inner surface of the pipe end at a point remote from, or on the opposite side of the center of the cover from the shoulder, means for operating the wedging means and means for exerting a continuous pressure or tension on the wedging means so that the wedging means and the cover are held tight under all conditions, this tension means being tensioned by the tightening of the wedging means.

I designates the cover, which is usually a flat disk resting at its margins at 2 on the pipe end 3, the cover having one or more depending shoulders 4 for thrusting against the inner surface of the pipe end.

5 designates a wedge or wedging shoulder for coacting with the inner surface of the pipe at a point remote from, or on the opposite side of the center of the disk from the shoulders 4. The shoulder 5 is operated from outside of the cover by suitable clamping means as a screw 6.

In the illustrated embodiment of my invention, the wedging shoulder 5 is provided at the end of a lever arm 7 fulcrumed or pivoted at 8 to the inner side of the cover near the margin thereof and on the same side of the center of the cover as the shoulders 4. Preferably, two spaced apart shoulders 4 are used and the lever 7 is pivoted to the cover 1 midway between the shoulders 4.

The compensating means for exerting a continuous pressure on the wedge or shoulder 5 is spring means and preferably spring means built into or inherent in the arm 7. The arm 7 is usually cast iron, and in order to make the arm resilient, it is angular in form or provided with a loop 9, it being well known that cast iron has some inherent resiliency. The screw 6 is connected to the lever 7 to move it on its pivot to tighten or loosen the wedge 5, and in the illustrated embodiment of my invention, the screw threads into a nut pivotally mounted on the arm or lever 7 or to have a rocking movement relative to the arm 7. Preferably, the nut is in the form of a yoke 10 embracing the free end of the lever 7 adjacent the wedge 5. The yoke is here shown as rectangular in form or as entirely enclosing the free end of the arm 7, and the arm 7 is provided with a transverse passage 11 therethrough for the screw 6. The screw 6 threads through one side of the yoke, extends through the passage 11 in the arm 7 and through a passage 12 in the opposite arm of the yoke. The opposite arms of the yoke and the lever are formed with coacting round surfaces 13 and 14 for pivotally connecting the nut or yoke 10 to the lever 7, so that the nut has a rocking or pivotal movement during the operation of the screw 6. The head 15 of the screw is located in a suitable depression 16 in the cover. The cover may be provided with vent openings 17.

Obviously, the lever 7 can be initially shifted without tensioning it to cause the wedge 5 to engage the inner face of the pipe end and thereafter during further tightening of the screw, the arm 7 or the loop 9 thereof will be tensioned so as to exert a constant thrust or pressure against the wedge 5 and its fulcrum point 8 and thus compensate for expansion and contraction of the pipe end or cover and hold the cover tight under all conditions. Also, owing to the lever 7, the variations in pipe ends of a given size are compensated for owing to the fact that the lever can swing on its pivot to initially engage the wedge 5 with the inner surface of the pipe end before the lever goes under tension. It will be understood that pipe ends of presumably the same size vary within limits, for instance, a four inch pipe made of sheet metal of one gage will have a larger internal diameter than a four inch pipe made of sheet metal of a smaller gage. Further, owing to the lever, the cover is not only tightened to the pipe end but is drawn down onto the pipe end during the tightening of the screw 6.

What I claim is:

1. A cover for pipe ends, the cover having a shoulder for thrusting against the inner surface of the pipe, a swinging arm located on the inner side of the cover and fulcrumed thereto and having a wedging surface at its free end for engaging the inner surface of the pipe at a point remote from said shoulder, a nut pivotally mounted on the free end of said arm, and a screw extending through the cover and threading into the nut.

2. A cover for pipe ends having a shoulder for thrusting against the inner surface of the pipe, a swinging arm located on the inner side of the cover and fulcrumed thereto and having a wedging surface at its free end for engaging the inner surface of the pipe at a point remote from said shoulder, a nut in the form of a yoke embracing the free end of said arm and mounted to have a rocking movement thereon, and a screw extending through the cover and threading into the yoke, the yoke encircling the free end of said arm and the arm having a transverse passage therethrough within the yoke and the screw threading into the yoke and extending through the passage in said arm.

3. A cover for pipe ends having a shoulder for thrusting against the inner surface of the pipe and a swinging arm pivoted to the inner side of the cover and having a portion extending from the pivot in a direction at an angle to the cover and in a general direction lengthwise of the pipe and a portion integral with the first portion inclining from the end of the former portion toward the cover in a general direction transversely of the pipe, whereby the arm is formed with a loop to increase the resiliency thereof, a wedging shoulder at the free end of the latter portion for coacting with the inner surface of the pipe and means exposed on the outer side of the cover for operating said arm on its pivot, the first shoulder and the pivot being located on the opposite side of the center of the cover from that on which the wedging shoulder is located, whereby movement of said arm to cause the wedging shoulder to tighten in a radial direction against the inner face of the pipe carries the first shoulder to thrust radially in a contrary direction against the inner surface of the pipe.

4. A cover for pipe ends having a shoulder for thrusting against the inner surface of the pipe and a swinging arm pivoted to the inner side of the cover near the margin thereof on the side of the cover on which said shoulder is located, said arm having a portion extending from its pivot in a direction at an angle to the cover and in a general direction lengthwise of the pipe along and near the inner face thereof and a portion integral with the former portion inclining from the end of the former portion toward the cover, diametrically of the pipe whereby the arm is formed with a resilient loop, a wedging shoulder at the free end of the latter portion for coacting with the inner surface of the pipe, and means exposed on the outside of the cover for operating said arm on its pivot, said arm and its pivot and the first shoulder being so located relatively to the second shoulder, that movement of said arm to cause the second shoulder to wedge against the inner face of the pipe thrusts the cover to cause the first shoulder to thrust outward radially in a contrary direction to the radial thrust of the wedging shoulder.

LOUIS J. SANDER.